3,133,272
RECORDING CIRCUIT
John W. Hopkins, Garwood, and Harry J. Schulte, Jr., Whippany, N.J., assignors to Bell Telephone Laboratories, Incorporated, New York, N.Y., a corporation of New York
Filed Dec. 29, 1961, Ser. No. 163,349
20 Claims. (Cl. 340—174)

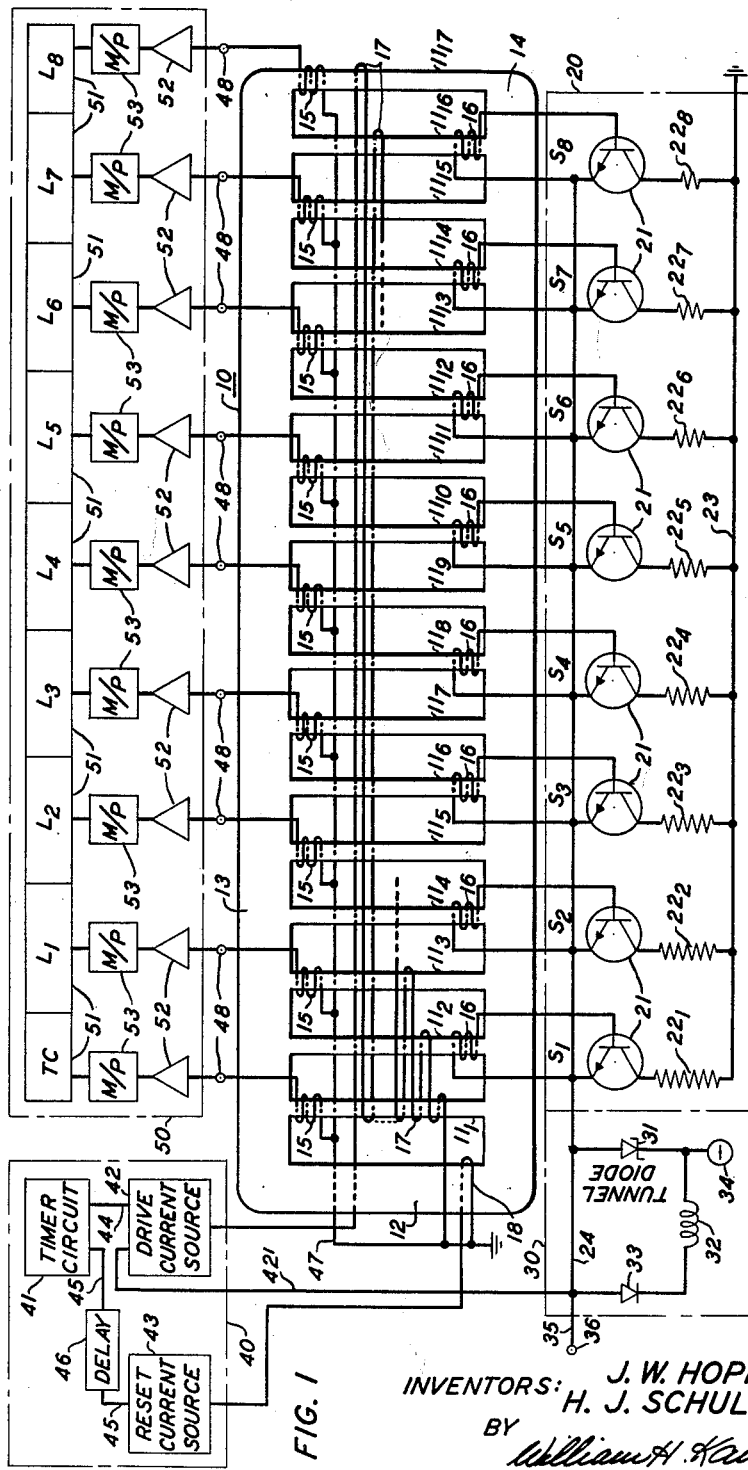

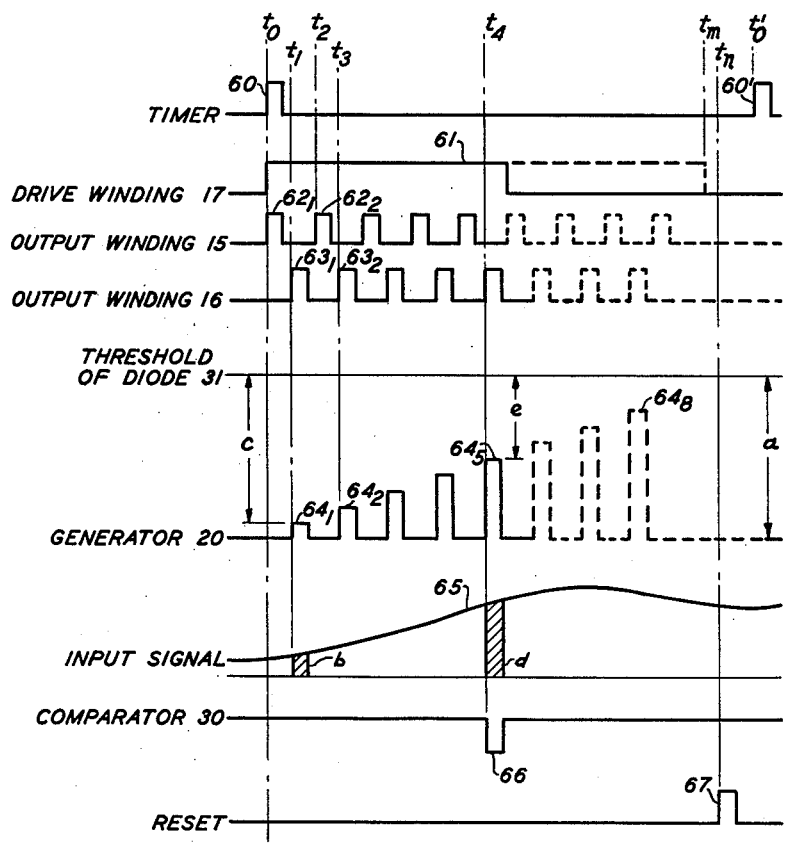

This invention relates to electrical recording circuits, and particularly to such circuits for recording the level distribution of radio receiver output signals.

In the design of radio systems such as mobile radio systems, for example, it frequently becomes necessary to determine the extent of transmission path loss of a transmitted signal. This is accomplished in circuits of the character here contemplated by recording the proportions of a total recording period that the signal under study is at particular levels. Registration counter apparatus is normally provided which is calibrated in predetermined decibel increments, the counters being operated under the control of samplings of the studied radio output signal to register the counts at each decibel level. The counter apparatus also provides for the registration of the total number of samplings made during the recording period. In order to obtain an accurate analysis of the transmission loss over a predetermined period it is obviously important that the distribution recording circuitry be capable of following instantaneous changes in signal level. Essential to this capability is a sampling rate which will insure that the maximum variations in signal level are faithfully recorded. In the past many level distribution recording circuits have failed to meet these requirements of sensitivity and sampling rate because of the sequence of operation employed. A sample of a transmitted signal is taken at a particular time, is stored as, say, a charge of a capacitor, the voltage across which is then in turn used to trigger a switching device associated with an impulse counter. Such a two-phase sample and hold operation obviously imposes limitations on the recording speed of the circuit. This in turn leads to a less than fully accurate presentation of instantaneous changes in transmitted signal level.

Prior art level distribution recording circuits have also presented the problem of false registering of signal levels. This has frequently resulted from the nature of the electrical recording circuits themselves and the inherent instabilities of the electrical components. Thus where vacuum tubes and electromechanical relays are employed in the recording circuits, changes in supply voltages, for example, can readily cause the recorder to register a false level representative signal. Contact chatter of relays is also frequently a source of spurious registration. It will also be appreciated that such prior art recording circuits are vibration sensitive. This may also present a serious problem since such circuits, when employed to examine transmission path loss of mobile radio systems, are frequently portable and may be subjected to a wide range of vibration in transit from one reading point to another.

In prior art level distribution recording circuits also, when the final level distribution count is registered by means of electromechanical impulse counters, high speeds of operation, although necessary from the viewpoint of accuracy of recording, have not been fully utilizable. Mechanical limitations of the counters themselves have thus in the past also imposed a ceiling on the rate to which the sampling of the signal under study may be increased. When the level distribution recording circuit is to be employed in connection with high speed electronic data processing apparatus, for example, extremely high speeds of sampling not only increase the accuracy of recording, but also render the recording circuit compatible with the associated electronic registration apparatus. A highly advantageous level recording circuit would thus be one which is inherently capable of high speed operation and at the same time able to operate at less than its full potential for adaptation for use with electromechanical counting registers.

Accordingly, it is an object of the present invention to provide an improved level distribution recording circuit capable of responding rapidly to changes in the level of the radio signal being examined.

It is another object of this invention to provide an improved level distribution recording circuit having a high degree of reliability, which is virtually insensitive to shock and vibration.

Still another object of this invention is to provide a new and novel level distribution recording circuit in which the possibility of false signal registration is substantially reduced.

A further object of this invention is to provide an improved level distribution recording circuit the outputs of which are compatible with high speed electronic registration circuits such as known data processing systems and which at the same time may be operated at a reduced speed for adaptation for use with electromechanical registration means.

The foregoing and other objects of this invention are achieved in one illustrative embodiment thereof in which the level of the input signal being examined controls the stepping of a ferrite counter structure. The circuit of this invention presents a novel and advantageous application of a multi-apertured magnetic flux steering structure, the principles of which are described in detail in the copending application of E. E. Newhall, Serial No. 818,130, filed June 4, 1959. Briefly, this flux steering structure is apertured to present a plurality of flux switching legs and a common flux return leg. Any flux induced in a flux switching leg finds closure through the common return leg and the latter leg is dimensioned such that its minimum cross-sectional area is at least equal to the sum of the minimum cross-sectional areas of the flux switching legs. In the structure of the foregoing copending application a drive flux is induced in the common return leg, with the drive applied being of a magnitude such that sufficient flux is induced in the return leg to saturate each of the switching legs which form the closure paths for the drive flux. Since the drive flux closes through the path of least reluctance, it closes, as a result, through the switching legs in a sequence as determined by their distance from the common return leg. The drive flux is thus steered in time separated steps through the switching legs. By providing each of the latter legs with output windings, sequential output signals may be obtained as the drive flux causes sequential flux changes in the switching legs. The ferrite structure exhibits substantially rectangular hysteresis characteristics with the result that upon any interruption of the drive, flux steering or stepping is arrested, the extent of the saturation of the switching legs being determined by the duration of the drive, flux stepping may be taken up from the point in the structure at which it was halted and continued until all of the legs are saturated by the drive flux. In the foregoing brief description, the drive was assumed to be applied to the common return leg to generate the operative drive flux. This is obviously not the only manner in which the flux stepping action of the structure may be accomplished, however. By applying a drive simultaneously to each of the switching legs, the same result may be achieved, that is, a sequential flux switching in the legs, and, as will be explained hereinafter, some advantages accrue from the latter mode of operation.

The flux stepping structure thus briefly described is advantageously adapted in accordance with this invention to operate under the ultimate control of the radio output signal under study, the level of the latter circuit determining the extent to which an induced flux is stepped along the switching legs of the structure. Each odd numbered switching leg has an output winding coupled thereto, the signals induced therein upon the switching of flux in the coupled switching legs being applied to operate the registration or recording circuits such as high speed electronic data processing circuits or mechanical impulse counters, the latter being assumed for illustrative purposes as employed in the description which follows. Thus, as the odd numbered legs are successively switched and successive output signals are generated, corresponding counters are each advanced one position. Should the drive flux in the ferrite structure advance through the entire sequence of flux switching legs, from the foregoing it will be appreciated that each of the associated corresponding counters will be advanced one position.

Coupled to each of the even numbered switching legs of the ferrite structure is also an output winding. The signals induced in these windings however, are employed to control a current generator circuit and thereby the sampling of the radio output signal under study. Each of the latter output windings is connected to a stage of a reference current generator adapted to provide a series of reference currents, the stages of the generator generating such currents in progressively increasing amplitude. As each stage of the generator is triggered by a signal in the connected output winding of a switching leg of the ferrite structure, a reference current of a discrete amplitude is thus generated. Each of the sequentially generated discrete reference currents is in turn applied to a comparator circuit having an operating threshold higher than the greatest of the reference currents. However, the radio output signal of changing levels is also applied to the comparator circuit with the result that the reference signal from each stage is added to the studied signal at each flux stepping of an even numbered switching leg of the ferrite structure.

Should at any stage the combined reference current and radio output signal be of sufficient magnitude to cause the operation of the comparator circuit, the latter circuit produces a control signal which is utlimately effective to interrupt the flux stepping in the ferrite structure. The magnitude of the reference currents are thus adjusted with respect to the operating threshold of the comparator circuit such that at the successive triggering of the reference current stages, only predetermined level increments of the radio output signal applied to the recorder are able to interrupt the stepping of the ferrite structure and thereby the advance of the counters. Each counter associated with a particular odd numbered switching leg is assigned a particular signal level of progressively increasing magnitude. These levels correspond precisely with the input signal levels required, when added to the reference currents, to trigger the operation of the comparator. The extent to which the counters are advanced during a single sampling cycle than indicate the highest signal level of the sampling cycle. A total count is also provided for, this count indicating the number of radio output signal samplings taken during a recording period. The total count, when taken with the number of times the examined radio output signal is at particular levels as indicated by the level counters, then provides an accurate representation of the proportions of the recording period at which the input signal under study is at each of the predetermined levels.

A reset operation at the termination of each sampling cycle, restores the ferrite structure and its flux switching legs to the original magnetic state in preparation for a subsequent sampling cycle. A level distribution recording circuit according to this invention, the organization and operation of which was described in general terms in the foregoing, provides an advantageous and reliable means for obtaining accurate and high speed readings of radio receiver output signal levels. The advantages achieved by the present invention are made possible by the novel features thereof which include the employment of a multi-apertured ferrite flux stepping structure as a memory element and stepping switch.

It is another feature of this invention that a current generator provides a plurality of reference currents of progressively increasing amplitude which are sequentially added to the radio receiver signal under study until a sum signal is obtained which exceeds the operating threshold of a comparator. At this point a control signal generator by the comparator is effective to arrest a progressive flux stepping in an associated ferrite structure and the advance of impulse counters.

According to another feature of this invention progressive flux stepping in a multileg ferrite structure is controlled to continue along the legs until a leg is reached corresponding to the level of a radio receiver signal being studied. Output signals generated by the progressive stepping of the legs actuate impulse counters or other registering apparatus to indicate the level of the radio receiver signal being studied.

The foregoing and other objects and features of this invention will be better understood from a consideration of the detailed description of one illustrative embodiment thereof which follows when taken in conjunction with the accompanying drawing in which:

FIG. 1 depicts one specific illustrative embodiment of a level distribution recording circuit according to this invention; and FIG. 2 depicts the time and magnitude relationships of the control signals generated by the various components of the circuit of FIG. 1 at particular operating times, the waveforms being shown in idealized form.

The organization of one specific illustrative embodiment of this invention is shown in drawing, the details of which may now be described with reference thereto. Central to a level distribution recording circuit according to the principles of this invention is a multi-apertured ferrite counter structure 10 shown in FIG. 1 of the drawing. The structure 10 is similar in principle and mode of operation to the structure described in the copending application of E. E. Newhall referred to hereinbefore and is formed of a ferrite magnetic material exhibiting substantially rectangular hysteresis characteristics, thus being capable of assuming stable magnetic states to which driven by applied magnetomotive forces. The structure 10 is apertured to define a plurality of flux switching legs $11_1$ through $11_{17}$ and a common flux return leg 12. Although the structure 10 is not drawn in a proportional scale in FIG. 1, the relative dimensions of the flux return leg 12 and the flux switching legs 11 are to be understood such that the minimum cross-sectional area of the leg 12 is at least equal to the sum of the minimum cross-sectional areas of the flux switching legs 11, the cross-sectional areas of the latter legs being maintained substantially equal. A pair of side rails 13 and 14 complete the structural aspects of the structure 10, the latter rails being formed and dimensioned such that each is fully capable of completing saturation flux closure paths from all of the flux switching legs 11 through the common flux return leg 12.

Each of the odd numbered flux switching legs $11_1$, $11_3$, $11_5$, etc., of the structure 10 has a counting output winding 15 inductively coupled thereto. Similarly, each of the even numbered flux switching legs $11_2$, $11_4$, $11_6$, etc., has a trigger output winding 16 coupled thereto. In the ferrite flux stepping structure described in the copending application of E. E. Newhall referred to in the foregoing, the flux drives and reset are accomplished by a drive and reset winding coupled to the flux return or drive leg, which in the present embodiment is the return leg 12. However, these drives and reset may be accomplished by equivalent drives applied to the flux switching legs themselves; and this latter mode of operation is employed in connection with the drive in the embodiment being described. In accordance with this mode of drive, a drive winding 17 is coupled to each of the flux switching legs 11 in a common winding arrangement such that each of the legs 11 is coupled to the winding 17 in a progressively decreasing number of turns. Specifically, although only representative turns are shown in FIG. 1 to avoid complexity, the drive winding 17 is coupled to the flux switching leg $11_1$ by seventeen turns, to the leg $11_2$ by sixteen turns, to the leg $11_3$ by fifteen turns, and so on, until the winding 17 is coupled to the last flux switching leg $11_{17}$ by a single turn. A reset winding 18 is coupled to the flux return leg 12 alone to restore the magnetic states of the return leg 12 and flux switching legs 11 after a flux switching operation. The purpose and advantages to be achieved by this manner of winding the drive winding will be described in further detail in connection with the description of an illustrative operation of the circuit of this invention hereinafter. The sense of the windings and the magnetomotive drives generated thereby will also be further referred to hereinafter.

The ferrite counter structure 10 described above comprises one element of a counting section of this invention. Associated with the structure 10 in the latter section is a reference current generator 20 which is operated partially under the control of trigger signals appearing in the trigger output windings 16 of the counter structure 10. The reference current generator 20 comprises eight stages $s_1$ through $s_8$ corresponding to the even numbered flux switching legs $11_2$ through $11_{16}$. Each of the stages $s$ of the generator 20 comprises a transistor 21 across the emitter and base of which is connected a trigger output winding 16 of a flux switching leg 11 of the counter structure 10. The collectors of the transistors 21 are connected through resistances 22 to a common ground bus 23. The values of the resistances $22_1$ through $22_8$ are selected in successively decreasing magnitude, the specific values being determined in accordance with the output currents required from each stage $s$ of the reference current generator 20. The manner of determining the specific values will be considered hereinafter in connection with an illustrative operation of the circuit. The emitters of the transistors 21, as well as one end of each of the trigger output windings 16, are also connected to a common conductor 24 which conductor 24 comprises a common output for the stages of the reference current generator 20.

Output signals generated by the reference current generator 20 are applied via the output conductor 24 to a comparator circuit 30 to which circuit the input receiver signals to be studied are also applied. As will be described in further detail, the comparator circuit 30 compares the level of the output signal of a radio receiver, which will be taken from its detector and hereafter termed detector current or signal, with the amplitude of each of the predetermined reference currents generated by the generator 20 under the control of the ferrite counter structure 10. The comparator circuit 30 continues the conductor 24 as a common electrical connection for a network of unilateral conducting elements. A two-branch parallel network is provided comprising in one branch a diode 31 which advantageously in this embodiment is a tunnel diode. The other branch includes an inductor 32 and a conventional diode 33. The primary two-branch network is connected at its other end to a source of negative potential 34. The detector current is applied to the comparator circuit 30 by means of an input conductor 35 connected at one end directly to the common conductor 24 and having at its other end an input terminal 36.

What has been described so far comprises the feedback control of the ferrite counter structure 10 energized by output signals appearing on the trigger output windings 16 of its flux switching legs 11 as flux is successively stepped along the latter legs. The feedback control in cooperation with the detector current input is effective to determine the extent and duration of the flux stepping in the structure 10 as driven by drive circuits 40. The latter circuits comprise a timer circuit 41, a drive current source 42, and a reset current source 43. The timer circuit 41, which may comprise any well known circuits capable of providing clock pulses of the character to be described hereinafter, is provided with a pair of outputs, one of which is connected by means of a conductor 44 to an input of the drive current source 42 and the other of which is connected by means of a second conductor 45 to an input of the reset current source 43. A delay circuit 46 is interposed between the timer circuit 41 and the reset current source 43 in the conductor 45 for reasons which will also appear hereinafter. Control of the drive current source 42 by the comparator circuit 30 is achieved via conductor 42' connecting a second input of the source 42 and the conductor 24. The drive current source 42 as well as the reset current source 43 and delay circuit 46 comprise well known circuits available to one skilled in the art. Accordingly, these circuits are shown in block symbol form only and will be described only as to the character and timing of the output signals to be generated thereby.

Returning to the remaining windings of the ferrite counter structure 10, the connections of these windings may now be described. The drive winding 17 and the reset winding 18 are connected at one end to outputs of the drive current source 42 and the reset current source 43, respectively. These windings are connected at their other ends to ground. The counting output windings 15 of the ferrite counter structure 10 are each connected at one end to a ground bus 47 and are provided at their other ends with an output terminal 48.

The counting section of this invention, the organization of which was described in the foregoing, provides sequential counting output signals on the terminals 48, the number being determined by the extent to which flux stepping in the counter structure 10 has progressed along the switching legs 11. To the output terminals 48 are connected corresponding input circuits of a registration circuit 50. The registration circuit 50 may comprise any one of a number of circuits capable of registering the number of signals appearing on each of the terminals 48 during a cycle of operation of this invention. Thus, for example, the registration circuit 50 may advantageously comprise suitable electronic data processing circuitry capable of extremely high operating speeds. In the illustrative embodiment being described, it will be assumed that the registration circuit 50 comprises circuitry capable of actuating electromechanical impulse counters for providing a visual numerical reading of the level distribution of the detector current under study over a predetermined period. A total of nine counters 51 are provided, each of which is capable of advancing one unit position in response to an input signal applied to an input thereof. Such counters are well known; one such suitable for use in this invention, for example, is that known commercially as the Elmeg Type PZ4RA. One of the counters 51, designated TC in FIG. 1, is advanced one unit position each time that a reading cycle is initiated and thus registers the total count of the recording circuit during a reading period. The remaining counters 51, designated $L_1$ through $L_8$, each represents a different signal level ranging from the highest level the registration of which is desired on the $L_1$ counter 51 to the lowest such level on the $L_8$ counter 51. Between the output terminals 48 of the counting section and the registration counters 51 themselves is interposed circuitry to provide suitable operating currents and potentials for the counters. Thus, connected directly to each of the terminals 48 is a buffer amplifier 52 each of which in turn is connected to a monopulser circuit 53. An output of each monopulser 53 includes the solenoid, not shown, of its associated counter 51. These circuits are also well known in the art and accordingly are also shown in block symbol form only. With the foregoing description of the organization of one embodiment of this invention, illustrative radio detector signal sampling cycles of operation may now be considered.

An illustrative operation of this invention may best be understood by reference to FIG. 2 where the outputs of the various components of the circuit of FIG. 1 are shown in time and magnitude relationships. The current pulses there shown are depicted in idealized form for purposes of simplicity. As the result of an assumed previous reset operation, it will further be assumed that the counter structure 10 is in a reset magnetic state. That is, each of the flux switching legs 11 will be assumed to have a remanent magnetization therein which is in the upward direction as viewed in the drawing. The flux thus existing in the legs 11 finds closure through the side rails 13 and 14 and thence downward through the common flux return leg 12. In this reset magnetic state the counter structure 10 is prepared for the application of a first drive thereto. The embodiment of this invention shown in FIG. 1 is adapted to have a radio detector current, the level of which is to be studied, applied thereto by means of the input terminal 36 from an available source such as, for example, the output of a conventional radio receiver having an output level range to be described.

A recording period of the circuit of FIG. 1 is initiated by the application of a positive current pulse 60 from the timer circuit 41 via the conductor 44 to energize the drive current pulse source 42. The current pulse 60 may be understood as appearing at the time $t_0$ at which time the current source 42 is also triggered into operation to apply a positive current pulse 61 to the drive winding 17. The total drive generated by the current pulse 61 is applied simultaneously to each of the flux switching legs 11 and is in a direction to switch these legs in the downward direction as viewed in the drawing. As is well known, the switching flux thus induced in the legs 11 will close through the paths of least reluctance which obviously in the case of the structure 10 is through the return flux leg 12 since it is the only remaining path to which no drive is being applied. Since the legs 11 are arranged in progressively increasing distances from the leg 12, the flux simultaneously induced in the legs 11 will close through the leg 12 in time separated steps. Although the induction of the switching flux in the legs 11 could as well have been accomplished by a single drive winding on, and thus a single drive applied to, the flux return leg 12 alone, the winding 17 arrangement as depicted in FIG. 1 positively assures that the leg $11_1$ will switch first with the following legs 11 switching in the order of their distance from the flux return leg 12. Although this would have been the case in any event, the foregoing winding arrangement serves to exaggerate the preference of the legs in terms of their distance from the flux closure path and thus further insures adequate spacing between the signals generated by the switching of the legs 11.

As the odd numbered switching leg $11_1$ reverses its direction of magnetization, a first output signal $62_1$ is induced in the counting output winding 15 coupled to the latter leg. The voltage thus induced across the winding 15 of the leg $11_1$, after amplification in the buffer amplifier 52, is applied to the monopulser 53 associated with the TC counter 51. The monopulser 53 is triggered to apply, in turn, an actuating current to the solenoid of the latter counter 51. The TC counter 51, as a result, is advanced one unit position indicating the initiation of one sampling cycle of operation. Up to this point the input radio detector current understood as being applied to the input terminal 36 has been inoperative to affect the operation of the recorder circuit. However, as the drive current pulse 61 continues in time, the even numbered flux switching leg $11_2$ of the structure 10 next reverses its magnetization, thereby inducing a positive trigger output voltage pulse $63_1$ across its trigger output winding 16. This trigger output voltage is also applied across the emitter and base of the transistor 21 of the stage $s_1$ of the reference current generator 20. During the application of the latter voltage the transistor 21 of the latter stage is caused to conduct current in its collector emitter circuit, the current following a path which may be traced from the ground bus 23, resistor $22_1$, collector-emitter circuit of the transistor 21 of stage $s_1$, a common conductor 24, through the network presented by the diodes 31 and 33 and the inductor 32, to the source of negative potential 34. The magnitude of the current generated by the transistor 21 of the stage $s_1$ is determined by the value of the resistor $22_1$ which resistor in this stage is determined as being the largest of the resistors $22_1$ through $22_8$. The current thus generated in stage $s_1$ of the generator 20 is designated $64_1$ in the table of FIG. 2. The signals $63_1$ and $64_1$ occur at the switching of the leg $11_2$ of the counter structure 10 which is represented as the time $t_1$ in FIG. 2. The current pulse $64_1$ is applied via the conductor 24 to the diode network of the comparator circuit 30. During the foregoing operation the input radio detector current of varying level, designated as the waveform 65 in FIG. 2, is also being applied to the comparator circuit 30 by means of the input terminals 36 and input conductor 35.

In the comparator circuit 30 the reference current pulse $64_1$ is compared with the input signal 65. If the sum of the two signals is equal to or more than a predetermined magnitude, the comparator circuit 30 is energized to generate a negative potential signal which is applied via the conductor 42' to the drive current source 42 to interrupt the operation of the latter circuit and thereby terminate the drive current pulse 61. A number of circuits capable of accomplishing the function of the comparator circuit 30 are readily devisable by one skilled in the art. One illustrative such circuit exploiting the high frequency performance, fast switching time, and stability of a tunnel diode is depicted in FIG. 1. When the combined reference current pulse 64 and input detector signal 65 are of sufficient magnitude to exceed the initial operating threshold of the tunnel diode 31, indicated as the level $a$ in FIG. 2, a negative voltage drop appears across the network including the diode 31. The conventional diode 33 acts as a shunt for the tunnel diode 31 to prevent the latter element from switching to its valley operating region, any sum currents capable of driving the diode 31 to this region thus passing through the shunt branch of the network to the potential source 34. The inductor 32 acts to delay the shunting action of the diode 33 to insure a complete initial switching action in the tunnel diode 31. Since the diode 31 is prevented from reaching its valley operation region, it readily restores to its normally off state at the termination of the reference current pulse 64. The tunnel diode 31 is thus advantageously employed in the comparator circuit 30 as a monopulser to control the operation of the drive current source 42.

From the foregoing discussion and a comparison of the reference current pulse $64_1$ with the input signal level during the application of the latter reference current, indicated by the shaded area $b$ in FIG. 2, it is evident that the sum of the latter signals at the time $t_1$ is not sufficient to drive the tunnel diode 31 of the comparator circuit 30 to its initial operation threshold $a$. As indicated in FIG. 2, a sum signal of the magnitude $c$ would be required to accomplish this. As a result, the voltage drop across the network of the comparator circuit 30 is insufficient to interrupt the operation of the drive current source 42 which latter circuit continues the generation of the drive current pulse 61. The magnetomotive drive generated by the latter pulse next switches the odd numbered flux switching leg $11_3$. As a result, a second counting output signal 62 is induced in the output winding 15 coupled to the latter leg at the time $t_2$. This signal $62_2$ is applied via the buffer amplifier 52 and monopulser 53 to operate the $L_1$ impulse counter 51 and advance it one unit position. The next stepping of flux in the structure 10 as a result of the applied drive current pulse 61 switches the flux switching leg $11_4$ with the result that a second trigger output signal $63_2$ is generated in the trigger output winding 16 coupled to the latter leg at the time $t_3$. A second reference current pulse $64_2$ is generated as a result in the stage $s_2$ of the reference current generator 20. This reference current pulse $64_2$ is again insufficient when combined with the assumed level of the input detector signal 65 to drive the tunnel diode 31 of the comparator circuit 30 to its operating threshold $a$. Accordingly, the drive current source 42 is permitted to continue its generation of the drive pulse 61 and the flux stepping in the structure 10 as a result continues in the alternating odd and even numbered legs 11 in the manner described for the legs $11_1$, $11_2$, $11_3$, and $11_4$. Counting output signals 62 and trigger output signals 63 continue to be generated also in the manner described in the foregoing. Each of the counters 51 actuated by the ouput signals 62 advances one unit position.

As represented in FIG. 2, the reference currents 64 generated as the result of the flux switching in the even numbered legs 11 progressively increase in magnitude. The generation of the reference currents 64 continues until one of sufficient magnitude is reached such that, when added to the instantaneous input detector signal level, the sum signal will be enough to drive the tunnel diode 31 to its threshold $a$. In accordance with the input signal 65 assumed in this illustrative operation as represented in FIG. 2, the instantaneous level of the latter signal at the occurrence of the reference current pulse $64_5$ represented by the shaded area $d$ is sufficient when added to the latter current pulse to cause the tunnel diode 31 to switch. As a result, a negative voltage pulse 66 is applied by the comparator circuit 30 via the conductor 42' to control the interruption of the drive current pulse source 42. As is evident from an inspection of the sequence of legs 11 in FIG. 1, ten of the flux switching legs 11 have switched their magnetization states in order to advance the circuit to the generation of the reference current $64_5$. In order to insure the complete switching of the last of these legs, $11_{10}$, the drive current source 42 is arranged to provide a drive pulse 61 for the full duration of the latter flux switching.

At the termination of the drive to the counter structure 10, as the result of the switching of the odd numbered flux switching legs $11_1$ through $11_9$, each of the TC and $L_1$ through $L_4$ counters 51 will have advanced one unit position. Since each of the level counters 51 is advanced only when the combined input radio detector current and particular reference current is insufficient to cause the interruption of flux stepping in the structure 10, the advance of a particular level counter 51 indicates that the difference between its associated reference current pulse 64 and the threshold $a$ of the diode 31, such as the difference $c$, has not been reached by the input radio detector current at that point in time. Since this difference becomes progressively smaller, each of the level counters 51 represents a successively lower input signal level. At the time $t_4$ when the last flux switching in the leg $11_{10}$ occurred and at which time the active portion of the sampling cycle of the operation being described was terminated, the advance of one unit position of each of the TC and $L_1$ and $L_4$ counters 51 indicates that for this single total count the input signal level was at least equal to the level represented by the difference $e$ indicated in FIG. 2 and which level is associated with the $L_4$ counter 51. Thus the extent to which the $L_1$ through $L_8$ counters 51 are actuated to advance one unit position during a single count indicates the lowest level reached by the input radio detector signal during that count. Should the sampling have continued to the end of the structure 10 by the continued application of the drive pulse 61 as represented by its dashed extension in FIG. 2, the remaining possible signals and reference currents as also indicated by dashed line waveforms in FIG. 2, would also have been generated. Each of the level counters 51 including the last counter $L_8$ would have been actuated to indicate that, during such sampling cycle, the level of the radio detector signal was at least equal to the difference between the reference current pulse $64_8$ and the threshold $a$ of the tunnel diode 31 of the comparator circuit 30.

The drive current source 42 is adapted to terminate the drive pulse 61 at a time $t_m$ to insure the complete switching of the last flux switching leg $11_{17}$ of the ferrite structure 10 should the level of the input detector current so permit. The timer circuit 41 output pulse 60 is also applied via the conductor 45 and delay circuit 46 to the reset current source 43. The delay provided by the circuit 46 is adjusted so that the source 46 is energized only after sufficient time has been provided to insure that a full counting operation may be accomplished by the ferrite structure 10 and is indicated as the time $t_n$ in FIG. 2. At that time a positive reset current pulse 67 is applied by the source 43 to the reset winding 18. The magnetomotive force generated thereby and applied to the drive leg 12 restores the flux in the structure 10 to its normal state, that is, in a downward direction in the flux return leg 12 and in an upward direction in each of the flux switching legs 11, the directions being as viewed in the drawing. As the result of this reset operation, voltages will be induced in each of the output windings 15 and 16. However, these voltages will be in a direction opposite to that described for the voltages generated during the previously described operation of the circuit of FIG. 1 and are readily discriminated against by the transistor stages of the reference current generator 20 and the buffer amplifiers 52. At the termination of the reset operation the structure 10 and the entire circuit of FIG. 1 is prepared for a subsequent sampling cycle of operation. This following cycle is initiated by the application at the time $t_0'$ of a next periodic pulse 60' from the timer circuit 41. The cycle of operation as described in the foregoing is then repeated. The repetition of the sampling cycles is continued for the period over which a reading of the detector signal level is required.

As an example of possible readings of the counters 51, assume the following settings of the counters 51 at the conclusion of a predetermined reading period:

| Counter 51: | Reading |
|---|---|
| TC | 10,000 |
| $L_1$ | 9,000 |
| $L_2$ | 8,000 |
| $L_3$ | 7,000 |
| $L_4$ | 6,000 |
| $L_5$ | 5,000 |
| $L_6$ | 4,000 |
| $L_7$ | 3,000 |
| $L_8$ | 2,000 |

Such a ready would indicate that, over a period including 10,000 sampling cycles, $9/10$ of the time the signal level was at least equal to the level assigned to the $L_1$ counter 51; $4/5$ of the time the signal level was at least equal to the level assigned to the $L_2$ counter 51; $7/10$ of the time the signal level was at least equal to the signal level assigned to the $L_3$ counter 51; etc.

As will be apparent from the foregoing description of one illustrative embodiment of this invention, the range of the radio detector signal level must be maintained below the threshold of the tunnel diode 31 of the comparator circuit 30 for proper operation. This may be readily accomplished by scaling means well known in the art so that the recorder circuit of this invention is readily adapted for use with known radio receiver circuits. Because of the mechanical aspects of the counters 51 described as illustrative means for providing the level readings, an upper limit is imposed on the speed of operation of the specific embodiment shown in FIG. 1 and described in the foregoing. When the terminals 48, however, are connected to electronic data processing circuits and the like, capable of high speeds of operation, the ferrite counter and associated circuitry may readily be driven so as to achieve a sampling rate of up to 25,000 per second.

What has been described is considered to be only one illustrative embodiment of this invention and various and numerous other devices may be devised by one skilled in the art without departing from the spirit and scope of this invention.

What is claimed is:

1. A recording circuit comprising a magnetic structure having substantially rectangular hysteresis characteristics, said structure being formed to present a plurality of flux stepping legs, drive means for successively inducing flux switching in said stepping legs, first and second output windings on alternating ones of said stepping legs, means for generating a plurality of reference signals of progressively increasing magnitude responsive to successive signals on said first output windings, input circuit means having a varying input signal applied thereto, signal comparing means energized responsive to said input signal and one of said reference signals when said input signal and said last-mentioned reference signal combined reach a predetermined threshold for generating a control signal, means responsive to said control signal for interrupting said drive means, and counting register means advanced responsive to output signals on said second output windings.

2. A recording circuit comprising stepping switch means having a plurality of stages energizable to generate successive output signals from said stages, drive means for energizing said stepping switch means, means for generating a plurality of reference signals of progressively increasing value responsive to successive output signals from alternating first ones of said plurality of stages, input circuit means having a varying input signal applied thereto, signal comparing means energized when said input signal and one of said reference signals combined reach a predetermined threshold for generating a control signal, means responsive to said control signal for interrupting said drive means, and counting register means advanced responsive to successive output signals from alternating second ones of said plurality of stages.

3. A recording circuit comprising stepping means for generating a plurality of pairs of control signals, current generating means energized responsive to first control signals of said pairs of control signals for generating a plurality of reference currents of different magnitudes, input circuit means for receiving a varying input signal, signal comparing means having a predetermined operating threshold energized responsive to said input signal and one of said reference currents when said input signal and said last-mentioned reference current combined reach said threshold for generating a cut-off signal, means responsive to said cut-off signal for interrupting said stepping means, and counting register means advanced responsive to second control signals of said pairs of control signals.

4. A recording circuit comprising a magnetic structure having substantially rectangular hysteresis characteristics, said structure being formed to define a plurality of flux stepping legs, drive means for successively inducing flux switchings in said stepping legs, first output windings coupled to alternating first ones of said stepping legs, second output windings coupled to alternating second ones of said stepping legs, a plurality of current generating means connected respectively to said first output windings, each energizable to generate a reference current of a different magnitude, input circuit means for receiving a varying input signal, signal comparing means having a predetermined threshold energized responsive to said input signal and any one of said reference currents when said input signal and said last-mentioned reference current combined reach said threshold for generating a cut-off signal, means responsive to said cut-off signal for interrupting said drive means, and a plurality of impulse counting means connected respectively to said second output windings.

5. A recording circuit as claimed in claim 4 also comprising means for subsequently resetting said magnetic structure.

6. A recording circuit as claimed in claim 5 in which said signal comparing means comprises a parallel network having at least one branch therein including a tunnel diode.

7. An electrical circuit comprising a magnetic structure apertured to define a plurality of flux switching legs and a flux return leg, drive inductive means including a drive current source coupled to said flux switching legs for causing successive flux switchings in said last-mentioned legs, first output windings coupled to alternate first ones of said flux switching legs and second output windings coupled to alternate second ones of said flux switching legs, a reference current generator means connected to each of said first output windings, each of said generator means being energizable to generate a current of a different magnitude, signal comparing means connected to each of said reference current generators and having an input circuit for receiving a varying input signal, said signal comparing means being energizable when said input signal and any one of said reference currents combined reach a predetermined threshold to generate a control signal, and means connected to said signal comparing means energized responsive to said control signal for controlling the interruption of said drive current source.

8. An electrical circuit as claimed in claim 7 also comprising count registration means connected to said second output windings energized responsive to signals on said last-mentioned windings.

9. An electrical circuit as claimed in claim 7 also comprising reset inductive means including a reset current source coupled to said flux return leg for resetting said magnetic structure.

10. An electrical circuit as claimed in claim 9 in which said drive inductive means also includes a drive winding coupled to said plurality of flux switching legs by a successively decreasing number of turns.

11. An electrical circuit comprising a magnetic structure of a material having substantially rectangular hysteresis characteristics, said structure being apertured to define a first and a second flux switching leg and a flux return leg, drive inductive means including a drive current source for causing successive flux switchings in said first and second switching legs, an output winding on each of said first and second switching legs, a reference current generator connected to the output winding of said first switching leg for generating a reference current of a predetermined magnitude responsive to signals on said last-mentioned output winding, a signal comparing means connected to said reference current generator having an input for receiving a varying input signal, said signal comparing means being energizable when said reference current and said input signal combined reach a predetermined threshold for generating a control signal, and means responsive to said control signal for interrupting said drive current source.

12. An electrical circuit as claimed in claim 11 also comprising reset inductive means including a reset current source for resetting said magnetic structure.

13. An electrical circuit as claimed in claim 12 in which said signal comparing means comprises a multi-branch network each having a diode therein, one of said diodes having a current-voltage characteristic which includes a region of negative resistance bounded by a first and a second region of positive resistance.

14. An electrical circuit as claimed in claim 12 also comprising impulse counting means connected to the output winding of said second switching leg.

15. An electrical circuit as claimed in claim 14 also comprising timing circuit means for alternately controlling said drive current source and said reset current source.

16. An electrical circuit comprising a plurality of signal generators for generating a plurality of reference signals of progressively increasing amplitude, drive means for sequentially controlling the energization of said plurality of signal generators, said drive means generating a counting signal before each energization of a signal generator, input circuit means connected to each of said signal generators for receiving a varying input signal, signal comparing means connected to said input circuit means energizable when said input signal and one of said reference signals combined reach a predetermined threshold for generating a control signal, means responsive to said control signal for interrupting said drive means, and counting means for counting said counting signals.

17. An electrical circuit as claimed in claim 16 in which said counting means comprises impulse counters for separately counting each of said counting signals.

18. An electrical circuit as claimed in claim 16 in which said drive means comprises a magnetic structure of a material having substantially rectangular hysteresis characteristics, said structure being apertured to define a numerical sequence of flux switching legs and a flux return leg, said legs being dimensioned such that the minimum cross-sectional area of said return leg is at least equal to the sum of the minimum cross-sectional areas of said switching legs, the minimum cross-sectional areas of said last-mentioned legs being substantially equal, a counting output winding on each of the odd numbered ones of said switching legs, a signal generator output winding on each of the even numbered ones of said switching legs, and drive winding means coupled to said switching legs.

19. An electrical circuit as claimed in claim 18 in which said drive winding means is coupled to said sequence of flux switching legs in a progressively decreasing number of turns.

20. An electrical circuit as claimed in claim 19 also comprising reset drive means coupled to said structure.

No references cited.